United States Patent [19]

Mousseaux et al.

[11] Patent Number: 4,887,882
[45] Date of Patent: Dec. 19, 1989

[54] ALIGNMENT METHOD, IN PARTICULAR FOR OPTICAL COMPONENTS

[75] Inventors: Daniel Mousseaux, Palaiseau; Bruno Chevet, Paris; Emmanuel Grard, Saint Michel sur Orge, all of France

[73] Assignee: Societe Anonyme dite : Alcatel Cit, Paris, France

[21] Appl. No.: 302,276

[22] Filed: Jan. 27, 1989

[30] Foreign Application Priority Data

Feb. 4, 1988 [FR] France .................. 88 01299

[51] Int. Cl.⁴ .............................. G02B 6/42
[52] U.S. Cl. .............................. 350/96.20; 350/96.15
[58] Field of Search ............. 350/96.20, 96.21, 96.15, 350/96.17; 250/227, 552; 357/17, 19, 30, 74, 80

[56] References Cited

U.S. PATENT DOCUMENTS

| | | | |
|---|---|---|---|
| 4,285,572 | 8/1981 | Beaudette et al. | 350/96.20 |
| 4,495,704 | 1/1985 | Hammer et al. | 33/6.13 |
| 4,500,165 | 2/1985 | Scholl et al. | 350/96.20 |
| 4,701,013 | 10/1987 | Jurczyszyn et al. | 350/96.20 |
| 4,714,315 | 12/1987 | Krause | 350/96.20 |

FOREIGN PATENT DOCUMENTS

| | | |
|---|---|---|
| 178390 | 4/1986 | European Pat. Off. . |
| 183124 | 6/1986 | European Pat. Off. . |
| 0173206 | 8/1986 | Japan .................. 350/96.20 |
| 0151812 | 7/1987 | Japan .................. 350/96.20 |

Primary Examiner—John D. Lee
Assistant Examiner—Phan T. Heartney
Attorney, Agent, or Firm—Sughrue, Mion, Zinn, Macpeak & Seas

[57] ABSTRACT

An optical fiber (F) and a laser (L) are fixed on the top faces of two bases (EF, EL) which also have two facing vertical faces. A spring (4) presses these two faces against each other so as to create thrust friction. The thrust force is initially moderate in order to enable the relative vertical and transverse positions (GV, GT) of the two bases to be adjusted smoothly, after which the force is increased progressively in order to prevent relative displacement taking place while the two bases are being welded together by means of a YAG laser. The invention is particularly applicable to making optical transmission heads usable in optical fiber telecommuncations systems.

9 Claims, 5 Drawing Sheets

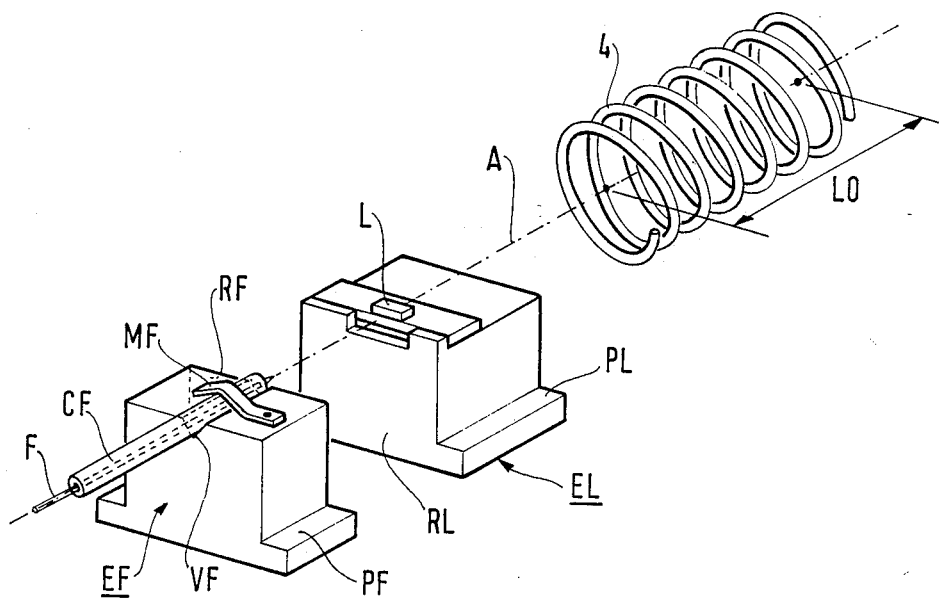
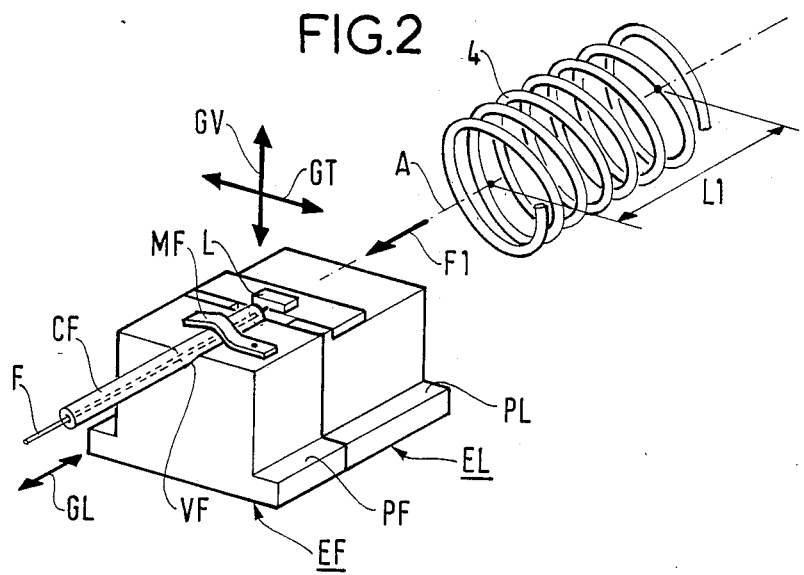
FIG.2

ALIGNMENT METHOD, IN PARTICULAR FOR OPTICAL COMPONENTS

The present invention relates to obtaining accurate alignment on a permanent basis.

BACKGROUND OF THE INVENTION

It is known that particularly accurate permanent alignment is required in order to obtain effective coupling between certain optical components. This applies when at least one of the components is a semiconductor laser and/or an optical fiber, and more particularly a monomode fiber. Although the present invention may be applicable to aligning components of various types, the following description relates to the case where the invention concerns coupling a monomode optical fiber to another component, i.e. injecting light into such a fiber or receiving light conveyed by said fiber.

Such light is generally modulated and conveys information which is transmitted by the fiber. It is usually produced by means of a semiconductor laser and it is detected by a photosensitive diode which is likewise constituted by a semiconductor chip. Such optical, and more particularly in the present case opto-electronic, components are generally fixed on rigid bases. Long-term optical coupling between a fiber and such a component is provided by means of a lens formed on the end of the fiber. Such coupling firstly requires said end to be positioned accurately with respect to said component, after which the fiber must be fixed relative to the base carrying the component. Such coupling is particularly difficult to achieve when light is to be injected into a monomode fiber since the real position of the fiber must then be less than a few nanometers from the optimum position, at least in transverse directions. If the position is offset to a greater extent, the coupling efficiency is no longer acceptable. An offset of 100 nm may, for example, cause coupling losses to go from 0 dB to 1 dB.

One known way of properly adjusting the position of the end of the fiber, i.e. of "positioning" the fiber, makes use of micromanipulators, e.g. of the piezoelectric type, using variations in optical coupling efficiency as a guide. For example, the fiber may be positioned approximately, initially, after which the laser emitter fixed on the base is caused to emit light and the quantity of light injected into the fiber is measured. The micromanipulators are then controlled to raise this quantity to a maximum. It may be preferable to inject light into the fiber at a distance from its end to be positioned and then to use the laser emitter as a receiving diode. Correct positioning has been achieved when the quantity of light received by said emitter is at a maximum.

However, once the optimum position has been achieved, it is difficult to fix the fiber on the base in such a manner as to retain said position permanently. To do this, two problems need to be solved. One of the problems is that the fixing operation itself, e.g. by welding, must not give rise to unwanted displacement of the fiber. The other problem is that of ensuring that the position of the fiber subsequently remains stable over time, in particular in the presence of temperature variations.

An alignment method exists which is applicable to coupling first and second optical components constituted by an optical fiber and a semiconductor laser. This method seeks to solve the two above-mentioned problems. Before describing the method specifically, certain operations are mentioned initially which are common in purpose both to said method and to the method of the invention:

orienting, positioning at least longitudinally, and permanently fixing said first and second components on first and second bases respectively, said bases having facing first and second transverse adjustment faces;

pressing said two adjustment faces against each other by applying a longitudinal thrust force;

applying transverse adjustment after said operation of pressing said faces together, thereby adjusting the relative transverse positions of said two components by applying transverse adjustment forces to at least one of said bases, said forces being limited but sufficient to cause said two adjustment faces to slide over each other; and fixing the bases together after said operation of transverse adjustment in order to fix said bases together in permanent manner.

This prior art method is described in European patent document EP-A-0 183 124. In this prior method, the said two bases co-operate with an intermediate part which also has two transverse adjustment faces such that two pairs of such faces are formed, with each pair being constituted by two faces that slide over each other during adjustment. One of the pairs is used for first positioning prior to said pair being locked by welding (i.e. the two faces are fixed together), and the other pair is used for second positioning, where necessary, prior to being locked by means of two screws which apply longitudinal thrust forces thereto.

This prior method suffers, in particular, from the drawback that said operation of fixing the bases (by welding or by screw clamping) gives rise to interferring displacements of one of the components (the optical fiber to be coupled) relative to the other (the semiconductor laser), and an objectionable fraction of said displacements cannot be predicted, i.e. cannot be compensated in advance during said operation of transverse adjustment.

The object of the present invention is to provide more accurate alignment than before in a manner which is simple and reliable, and in particular to obtain substantially optimum coupling with an optical fiber.

More particularly, an object of the invention is to reduce the risks of interferring displacement of one component relative to the other while the bases are being fixed together.

SUMMARY OF THE INVENTION

The method of the invention includes the common operations mentioned above. Compared with the above-mentioned prior method, the method of the invention includes the improvement whereby said thrust force is applied in controllable manner, said thrust force having a first value (F1) during said operation of transverse adjustment, said first value being sufficiently small to ensure that the friction forces opposing said relative sliding remain less than said limit on the adjustment forces;

said method then includes an operation of reinforcing the thrust by increasing said thrust force to a second value (F2) which is greater than said first value, thereby obtaining increased friction forces, said increase being performed sufficiently progressively to avoid inducing mutual displacement of said bases (EF, EL); and said operation of fixing the bases is performed after said operation of reinforcing the thrust and in such a manner that said increased friction forces prevent interferring displacements being induced by said fixing operation.

Preferably, said bases are made of metal and said operation of fixing the bases together is performed by means of short pulses of localized high-energy radiation in order to form strong weld spots while inducing interferring forces which are small only, at least along said transverse directions. One known way of providing such pulses is to use a YAG laser.

Said two bases are preferably solid metal parts constituted by the same metal having a low coefficient of thermal expansion and a high melting temperature. This metal may be an alloy of Fe, Ni, and Co, for example. This avoids objectionable deformations which could take place during temperature variations and/or over time.

It is also preferable for said front adjustment faces of said two bases to be plane and polished so as to slide over each other smoothly.

It is also preferable for said adjustment faces of said two bases to remain substantially coextensive during said transverse adjustment operation and for their contact over to have two dimensions of more than 0.2 mm when coupling an optical fiber so as to ensure that said two bases are properly guided during transverse adjustment. For example, when said adjustment face is square having a side of length lying in the range of 1 mm to about 20 mm, said first and second values of the thrust force lie, for example, respectively between about 0.1 daN and about 1 daN and between about 2 daN and about 20 daN.

The general shapes of the two bases may, for example, be substantially two prisms having longitudinal generator lines and coextensive square sections.

Each of them preferably has bilateral flanges of increased width running parallel to a carrier face carrying said component and at a distance from said face in order to constitute two shoulders on two side edges of said adjustment face, said weld spots being made both on said carrier face and on said shoulders without altering the orientation of said radiation. It is thus easy to obtain strong mechanical fixing with the addition of a minimum amount of energy, thereby further reducing the risks of deformation.

Also preferably, said thrust force is generated by means of an adjustment device comprising:
  a first structure provided with a first base support for supporting said first base;
  a second structure provided with means for holding it stationary relative to said first structure, and with a second base support for carrying said second base;
  one of said two structures being a thrust structure in which said base support is a thrust carriage, said structure comprising:
    longitudinal guide means for guiding said thrust carriage;
    a thrust spring for applying said thrust force to said thrust carriage;
    a displaceable thrust piece constituting a bearing surface for said thrust spring; and
    means for displacing said displaceable thrust piece for causing said piece to move progressively from a base adjustment position to a base fixing position with said thrust spring generating said first and second thrust force values respectively in said positions;
  at least one of said two structures being an adjustment structure provided with means for adjusting the position of one of said base supports in at least one transverse direction.

Such a device may be used for performing numerous alignments, in particular for optical coupling.

When performing such coupling, it preferably carries means for measuring the coupling efficiency easily during said adjustment operations.

Also preferably, when coupling to an optical fiber, the method further includes the following operations:
  prior to said operation in which said adjustment faces are pressed against each other, a V-section centering groove is formed in a carrying face of said first base;
  a length of said fiber is inserted in a fiber duct; and
  said fiber duct is pressed into said centering groove in order to orient said length of fiber.

Said holding duct may be in the form of a tube made of a low expansion alloy of Fe, Ni, and Co. It is pressed into the centering groove by means of a spring blade, and is then fixed to the edges of the groove by four weld spots prior to said operation of transverse adjustment.

BRIEF DESCRIPTION OF THE DRAWINGS

An implementation of the invention applying the dispositions mentioned above is described in greater detail below by way of non-limiting example and with reference to the accompanying diagrammatic figures. It should be understood that the various items described and shown may be replaced by other items performing the same technical function without going beyond the scope of the invention. When the same item appears in several figures, it is designated therein by the same reference symbol.

FIGS. 1 to 5 are exploded perspective views of various essential parts used in the successive stages of the method of the invention.

MORE DETAILED DESCRIPTION

Figure 3:
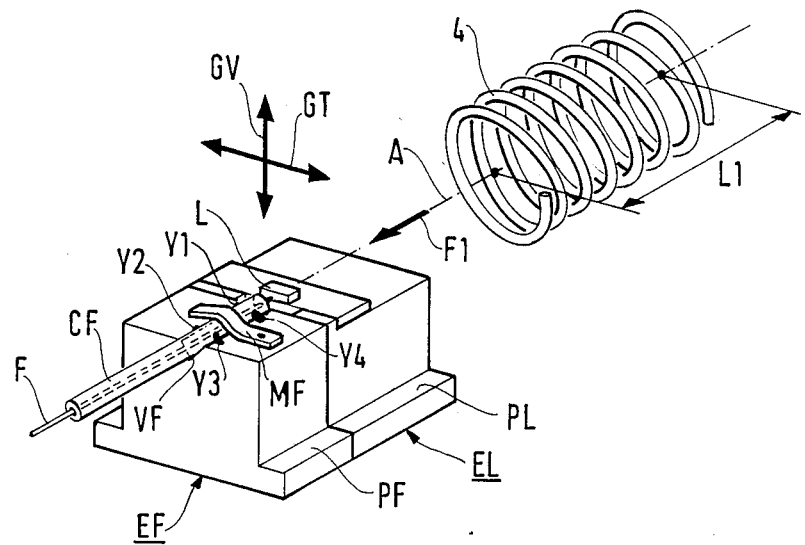

In the example given, said second component is a laser diode L fixed at the front of the top face of a laser base EL having a front adjustment face RL. This laser base constitutes said second base.

Said first component is a monomode optical fiber F having a holding length close to its coupling end fixed in a fiber duct CF. A spring blade MF holds the duct in a centering V-groove VF formed in the top face of a fiber base EF and extending perpendicularly to the front adjustment face RF of said base. This face is hidden in the figures but has the same shape and size as the face RL. The spring MF is soldered or brazed to the top face of the base EF which constitutes said first base.

All of these parts are consumed each time a laser head is made. Such a head is constituted by these parts after they have been permanently fixed to one another, apart from the spring blade MF which was soldered or brazed on the top face of the base EF and which is subsequently removed (see FIG. 5).

Said longitudinal direction is the axial direction A of the fiber F. It is horizontal. Said transverse directions are the vertical direction along arrow GV in FIG. 2 and a horizontal direction along arrow GT which is perpendicular to the axis A and which is referred to below simply as the transverse direction.

Said carrying faces of the two bases EL and EF are their top faces. Their said flanges of increased width are shown at PL and PF respectively.

FIG. 1 shows two bases EL and EF after being put into place and fixed in a fiber carrying structure and in a laser carrying structure (not shown here) which constitute said first and second structures and which form part of a device which is decribed below. This operation of putting the bases into place puts their two adjustment faces face-to-face and constitutes a first orientation operation since it constrains the two adjustment faces RL and RF to be exactly vertical.

This operation is followed (see FIG. 2) by a second orientation operation which is performed by a first operation of putting said two adjustment faces into mutual contact by moving said two structures longitudinally relative to each other while exerting minimal thrust force, with the base EF being mounted on a turntable 2 (see FIG. 7) capable of rotating freely about a vertical axis and subsequently of being locked in position.

During these operations, said thrust spring 4 which is coaxial with the two adjustment faces extends over a relaxed length L0 (see FIG. 1).

As shown in FIG. 2, the two adjustment faces are then pressed against each other with said first value of the thrust force which is represented by an arrow F1 and which is applied via the compressed thrust spring 4. As shown, the spring then has a length L1 which is shorter than L0.

The fiber duct CF is displaced longitudinally with moderate friction in the groove VF along an arrow GL by means (not shown) in order to obtain first maximum optical coupling. Well-known means (not shown) are used for measuring said coupling during said operation of adjusting the longitudinal position.

Maximum coupling can be obtained by virtue of the fact that vertical and transverse adjustment members incorporated in the device described below are used during the same period to perform displacements by sliding and tending to increase said optical coupling maximum. These vertical and transverse displacements are represented by the arrows GV and GT.

Figure 4:
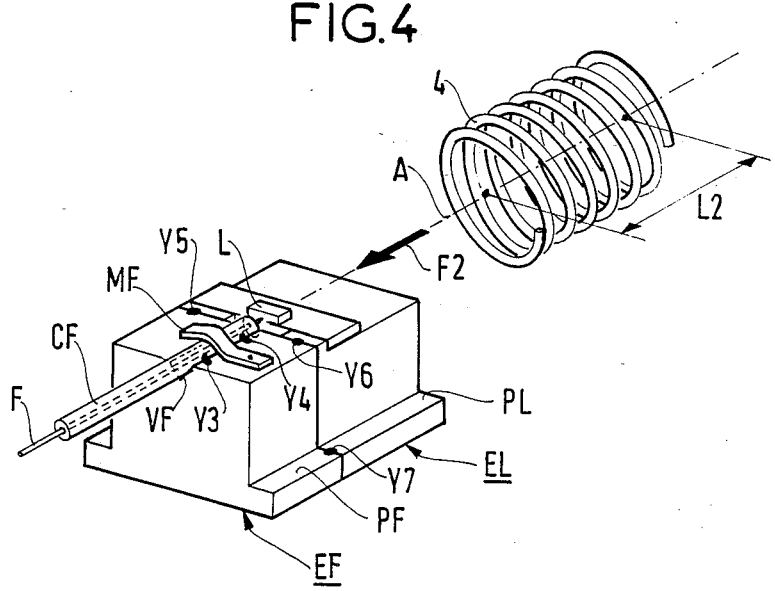

Once said first maximum coupling has been obtained, a YAG laser is fired four times in order to obtain two weld spots such as Y3 and Y4 on each side of the duct thereby fixing the duct CF to the base EF. Two of these spots are hidden in the figure. They are symmetrical to the spots Y3 and Y4. After this operation of fixing the duct CF to the base EF, optical coupling is greatly reduced. After complete cooling down, subsequent vertical and transverse adjustments along the arrows GV and GT are performed in order to obtain a second optical coupling maximum. Once this has been achieved, and as shown in FIG. 4, the thrust force is increased progressively until it takes up said second value F2 with the spring 4 taking up a length L2 which is shorter than L1. The YAG laser is then fired four times vertically in order to obtain four weld spots such as Y5, Y6, and Y7 distributed around the edge of the contact surface between the two bases EL and EF, with two spots Y5 and Y6 being on the top faces, and with the other two spots being on the flanges of increased width PL and PF, one of said spots being the spot Y7 and the other being hidden in the figure and located symmetrically to the spot Y7.

Figure 5:
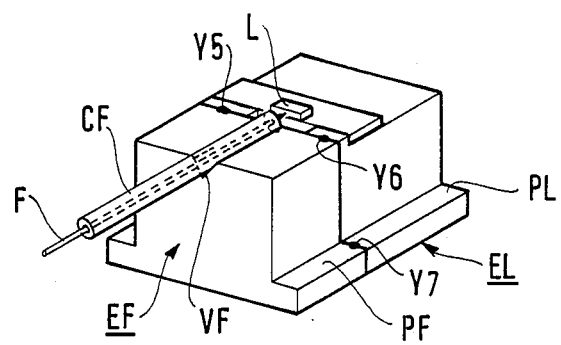

As shown in FIG. 5, the spring MF is removed and a subassembly is obtained which can be mounted in a housing in order to constitute a laser head which is usable in a telecommunications system.

Figure 6:
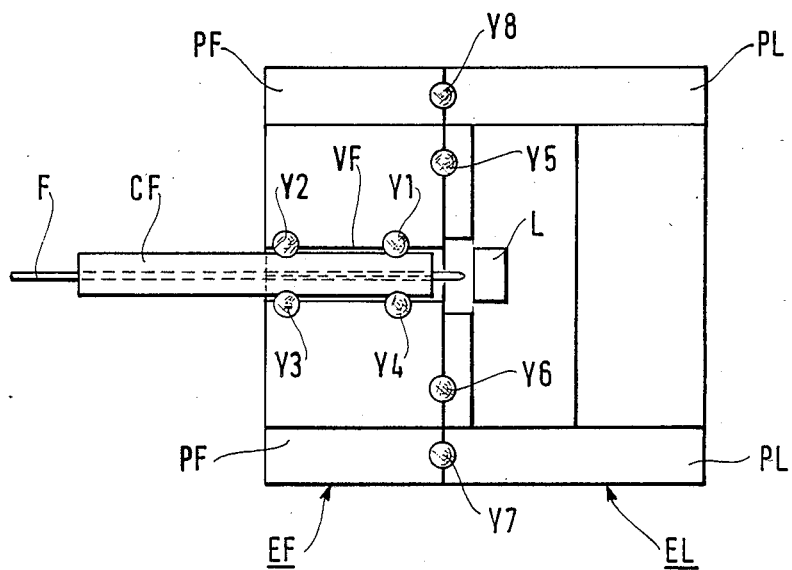
FIG. 6 is a plan view on a larger scale showing two bases fixed to each other.
Figure 7:
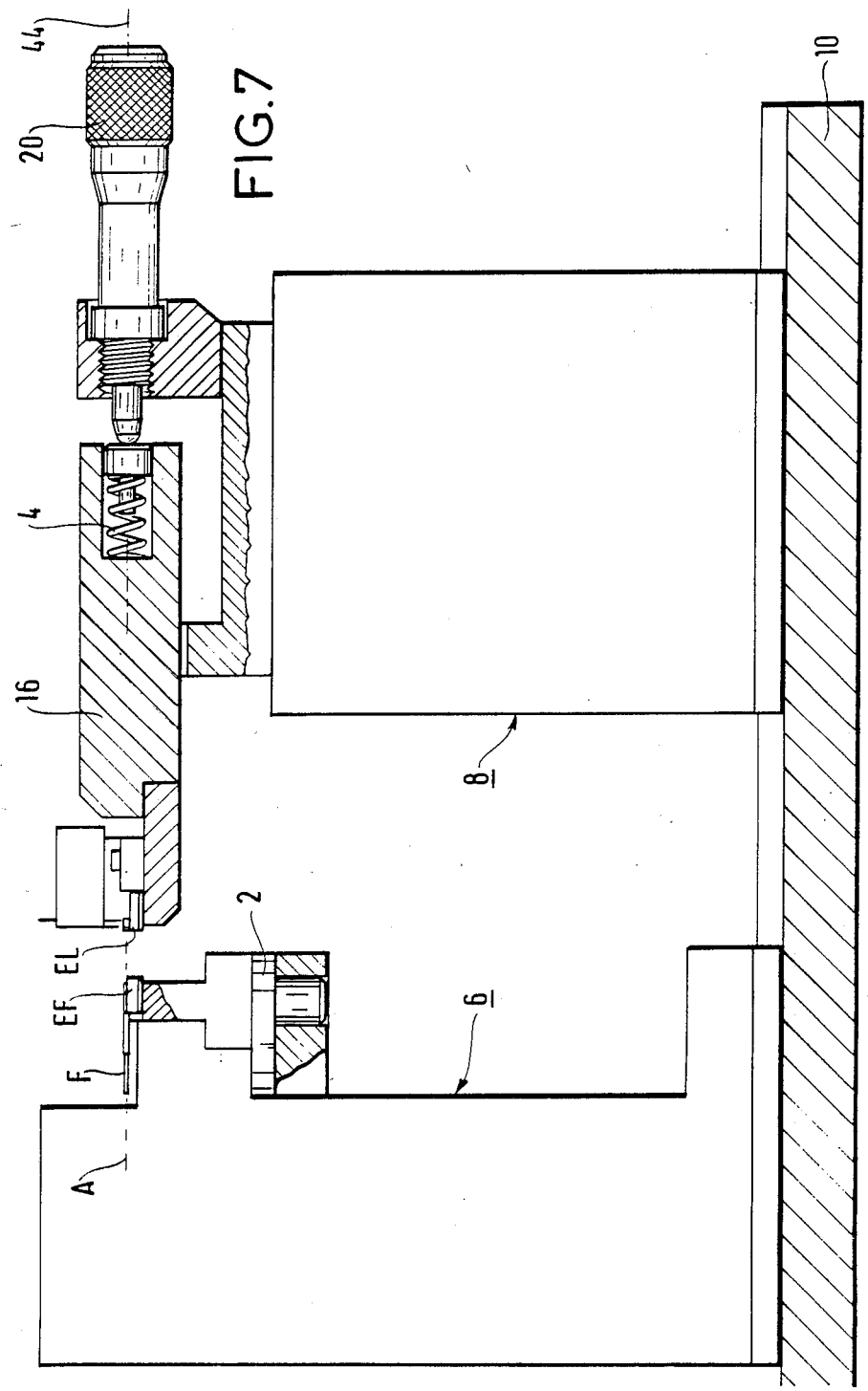
FIG. 7 is a more detailed side view in fragmentary longitudinal central section showing a device used for implementing the method and incorporating or carrying said essential parts.
Figure 8:
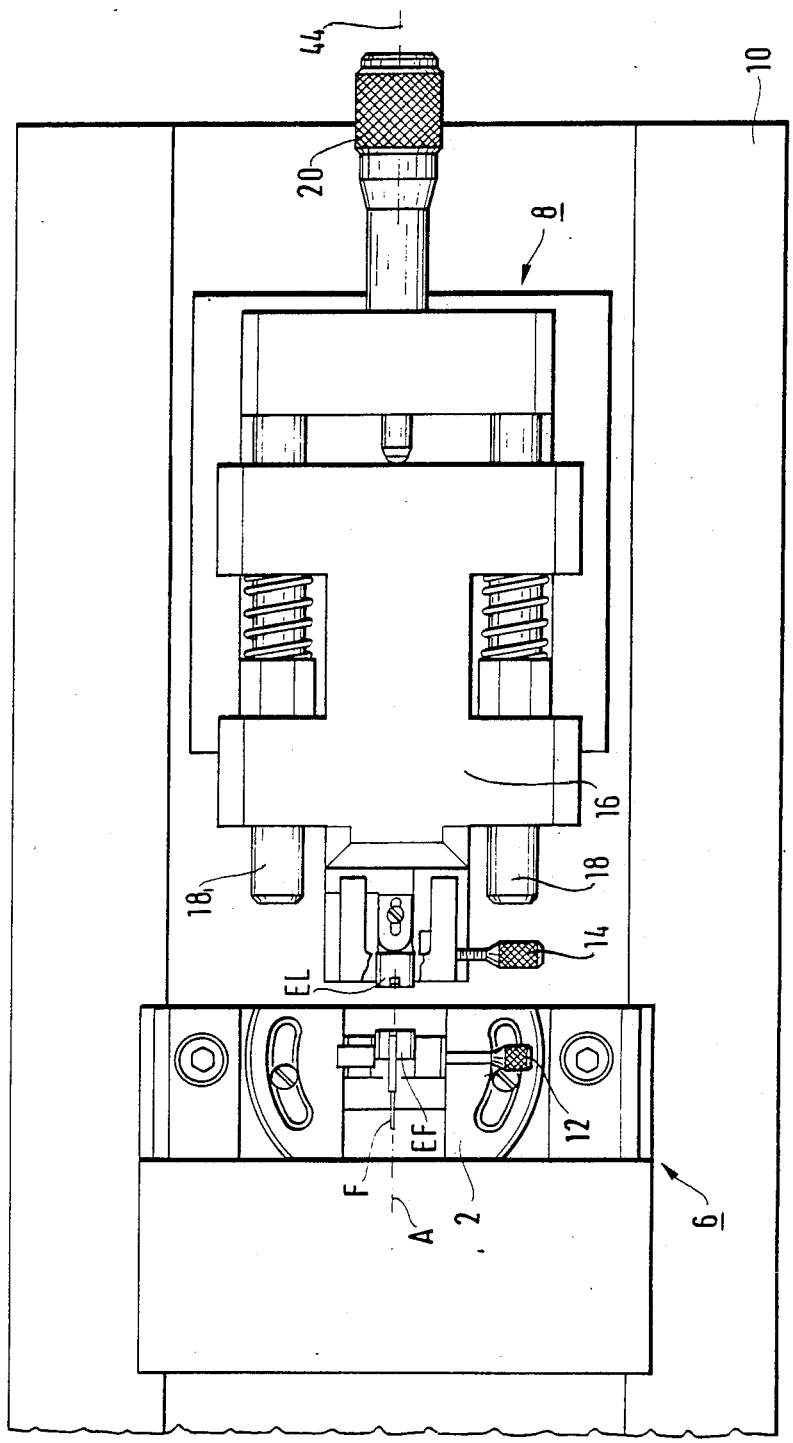
FIG. 8 is a plan view of the same device.

As shown in FIGS. 6 and 7, said fiber-carrier structure 6 and said laser-carrier structure 8 simultaneously constitute said adjustment structure 6 and said thrust structure 8, respectively. Initially they can slide longitudinally on a base 10 to which they may subsequently be fixed.

The base EF is held on said turntable 2 by means of a screw 12, said turntable constituting said base support of the fiber carrying structure 6.

The laser base EL is fixed on a thrust carrier 16 of the laser carrying structure 8 may means of a screw 14. The carriage constitutes said base support of said structure.

The longitudinal displacements of said carriage relative to said structure are guided by two shafts 18 and are driven by a micrometer screw 20 which compresses a helical spring 4 constituting said thrust spring via a thrust piece 22. Said screw, spring, and piece are disposed along a common longitudinal axis 44 which passes through the centers of the square adjustment faces on the two bases EL and EF.

The fiber-carrier structure 6 includes means for adjusting the vertical and horizontal positions of the base 2. In conventional manner, these means (not shown) comprise micrometer screws acting on elements guided along vertical and transverse axes.

The solid parts of the device are made of cast iron in order to damp vibrations.

The method described above has the following advantages in particular:
since the bases are firmly pressed against each other while they are being fixed together by the YAG laser, the interferring relative displacement of said two bases is very small and the loss in coupling can thus be less than 0.5 dB;
the highly localized heating obtained by using YAG welding makes it possible to continuously monitor laser emission coupling during the assembly stages; and
the use of metal-to-metal welding with a metal having a very high melting point provides a guarantee against creep phenomena which, in lower melting point brazing operations, may give rise to changes in coupling over time in the presence of thermal stresses.

Assemblies made in this way have been tested at temperatures of about 100° C. for periods of time of about 100 hours without exhibiting significant change in optical coupling.

We claim:

1. An alignment method in particular for optical components for the purpose of obtaining accurate and permanent alignment between a first component and a second component along a longitudinal direction, said method comprising the following operations:
orienting, positioning at least longitudinally, and permanently fixing said first and second components on first and second bases respectively, said bases having facing first and second transverse adjustment faces;

pressing said two adjustment faces against each other by applying a longitudinal thrust force;

applying transverse adjustment after said operation of pressing said faces together, thereby adjusting the relative transverse positions of said two components by applying transverse adjustment forces to at least one of said bases, said forces being limited but sufficient to cause said two adjustment faces to slide over each other; and fixing the bases together after said operation of transverse adjustment in order to fix said bases together in permanent manner;

said method including the improvement whereby:

said thrust force is applied in controllable manner, said thrust force having a first value during said operation of transverse adjustment, said first value being sufficiently small to ensure that the friction forces opposing said relative sliding remain less than said limit on the adjustment forces;

said method then includes an operation of reinforcing the thrust by increasing said thrust force to a second value which is greater than said first value, thereby obtaining increased friction forces, said increase being performed sufficiently progressively to avoid inducing mutual displacement of said bases; and said operation of fixing the bases is performed after said operation of reinforcing the thrust and in such a manner that said increased friction forces prevent interferring displacements being induced by said fixing operation.

2. A method according to claim 1, in which said bases are made of a weldable material, and in which said operation of fixing the bases together is peformed by means of short pulses of localized high-energy radiation in order to form strong weld spots while inducing interferring forces which are small only, at least along said transverse directions.

3. A method according to claim 2, in which said pulses of radiation are laser pulses.

4. A method according to claim 2, wherein said adjustment faces of said two bases remain substantially coextensive during said operation of transverse adjustment.

5. A method according to claim 2, wherein said two bases are solid pieces made of the same metal having a low coefficient of thermal expansion and a high melting temperature.

6. A method according to claim 2, wherein each of said two bases has bilateral flanges of increased width running parallel to a carrier face carrying said component and at a distance from said face in order to constitute two shoulders on two side edges of said adjustment face, said weld spots being made both on said carrier face and on said shoulders without altering the orientation of said radiation.

7. A method according to claim 1, wherein said thrust force is generated by means of an adjustment device comprising:

a first structure provided with a first base support for supporting said first base;

a second structure provided with means for holding it stationary relative to said first structure, and with a second base support for carrying said second base;

one of said two structures being a thrust structure in which said base support is a thrust carriage, said structure comprising:

longitudinal guide means for guiding said thrust carriage;

a thrust spring for applying said thrust force to said thrust carrige;

a displaceable thrust piece constituting a bearing surface for said thrust spring; and means for displacing said displaceable thrust piece for causing said piece to move progressively from a base adjustment position to a base fixing position with said thrust spring generating said first and second thrust force values respectively in said positions;

at least one of said two structures being an adjustment structure provided with means for adjusting the position of one of said base supports in at least one transverse direction.

8. A method according to claim 1, in which said first and second components are respectively an optical fiber and an optical component which are to be aligned for coupling purposes, with at least said operation of transverse adjustment including measuring said coupling.

9. A method according to claim 8, wherein said orientation operation itself comprises the following operations:

prior to said operation in which said adjustment faces are pressed against each other, a V-section centering groove is formed in a carrying face of said first base;

a length of said fiber is inserted in a fiber duct; and said fiber duct is pressed into said centering groove in order to orient said length of fiber.

* * * * *